US005521309A

United States Patent [19]
Antkowiak et al.

[11] Patent Number: 5,521,309
[45] Date of Patent: May 28, 1996

[54] TERTIARY-AMINO ALLYL-OR XYLYL-LITHIUM INITIATORS AND METHOD OF PREPARING SAME

[75] Inventors: Thomas A. Antkowiak, Wadsworth; James E. Hall, Mogadore; David F. Lawson, Uniontown; John R. Schreffler, Clinton; Mark L. Stayer, Jr., Suffield, all of Ohio

[73] Assignee: Bridgestone Corporation, Tokyo, Japan

[21] Appl. No.: 363,111

[22] Filed: Dec. 23, 1994

[51] Int. Cl.$^6$ .......................... C07D 295/04; C08F 4/48; C07C 211/21

[52] U.S. Cl. .................. 540/612; 540/450; 540/484; 546/192; 546/348; 546/350; 548/578; 548/579; 564/373; 564/391; 564/509; 260/665 R; 502/155; 502/157; 526/180

[58] Field of Search ....................... 526/180; 502/155, 502/157; 540/450, 612, 484, 611; 546/192, 350, 348; 548/578, 579; 564/373, 391, 509, 305, 336; 260/665 R

[56] References Cited

U.S. PATENT DOCUMENTS

| | | | |
|---|---|---|---|
| 2,849,432 | 8/1958 | Kibler et al. | 260/94.2 |
| 3,109,871 | 11/1963 | Zalinski et al. | 260/85.1 |
| 3,177,190 | 4/1965 | Hsieh | 260/94.2 |
| 3,178,398 | 4/1965 | Strobel et al. | 260/85.1 |
| 3,240,772 | 3/1966 | Natta et al. | 260/88.7 |
| 3,290,277 | 12/1966 | Anderson et al. | 260/88.2 |
| 3,317,918 | 5/1967 | Foster | 260/83.7 |
| 3,326,881 | 6/1967 | Uraneck et al. | 260/94.6 |
| 3,331,821 | 7/1967 | Strobel | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,652,456 | 3/1972 | Naylor | 526/335 X |
| 3,856,877 | 12/1974 | Otsuki et al. | 260/677 R |
| 3,935,177 | 1/1976 | Muller et al. | 260/84.7 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,247,418 | 1/1981 | Halasa et al. | 252/431 N |
| 4,316,001 | 2/1982 | Boileau et al. | 528/14 |
| 4,338,085 | 5/1983 | Fujimaki et al. | |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,515,922 | 5/1985 | Sakakibara et al. | 525/99 |
| 4,614,771 | 9/1986 | Watanabe et al. | 525/351 |
| 4,616,069 | 10/1986 | Watanabe et al. | 525/370 |
| 4,647,634 | 3/1987 | Jalics | 526/174 |
| 4,677,153 | 6/1987 | Kitahara et al. | 524/552 |
| 4,734,461 | 3/1988 | Roggero et al. | 525/293 |
| 4,735,994 | 4/1988 | Rogger et al. | 525/279 |
| 4,736,003 | 4/1988 | Schneider et al. | 526/190 |
| 4,791,174 | 12/1988 | Bronstert et al. | 525/274 |
| 4,816,520 | 3/1989 | Bronstert | 525/285 |
| 4,834,120 | 6/1989 | Halasa et al. | 525/53 |
| 4,835,209 | 5/1989 | Kitagawa et al. | 524/507 |
| 4,894,409 | 1/1990 | Shimada et al. | 524/492 |
| 4,914,147 | 4/1990 | Mouri et al. | 524/495 |
| 4,931,376 | 6/1990 | Ikematsu et al. | 526/164 |
| 4,935,471 | 6/1990 | Halasa et al. | 525/359.1 |
| 4,978,754 | 12/1990 | Ibi et al. | 544/176 |
| 5,066,729 | 11/1991 | Stayer, Jr. et al. | 525/315 |
| 5,112,929 | 5/1992 | Hall | 526/181 |
| 5,115,035 | 5/1992 | Shiraki et al. | 525/314 |
| 5,149,457 | 9/1992 | Smith | 252/182.12 |
| 5,153,159 | 10/1992 | Antkowiak et al. | 502/155 |
| 5,248,737 | 9/1993 | Sivak et al. | 526/113 X |
| 5,292,790 | 3/1994 | Shimizu et al. | 524/496 |

FOREIGN PATENT DOCUMENTS

| | | |
|---|---|---|
| 0067111A2 | 5/1982 | European Pat. Off. . |
| 0180141A1 | 10/1985 | European Pat. Off. . |
| 0207565A1 | 6/1986 | European Pat. Off. . |
| 0264506A1 | 10/1986 | European Pat. Off. . |
| 0282437A2 | 3/1988 | European Pat. Off. . |
| 0290883A1 | 4/1988 | European Pat. Off. . |
| 0316255A2 | 10/1988 | European Pat. Off. . |
| 0451603A2 | 3/1991 | European Pat. Off. . |
| 2250774 | 11/1974 | France . |
| 138070 | 10/1979 | Germany . |
| 247455 | 3/1986 | Germany . |
| 54-65788 | 11/1977 | Japan . |
| 59-164308 | 9/1984 | Japan . |
| 2117778 | 3/1983 | United Kingdom . |

OTHER PUBLICATIONS

L. Duhamel et al, "β–Lithioenamines . . .", JACS, 99:25, 8356–7 (1977).

"Functionally Substituted Organolithium Compounds, The Lithium Derivatives of The Dimethylbenzylamines", C. T. Viswanathan et al., J. Organometallic Chem., 54 (1973) 1–7.

"Lithiation of N,N–dimethylmethallylamine," Fitt et al., J. Org. Chem., 1981, 46, 3349–3352.

"3–Dimethylaminopropyl–Lithium–An Analytical and Kinetic Investigation of a New Initiator System for Polymer Synthesis" by Eisenbach et al., European Patent Journal, vol. 11, pp. 699–704 (1975).

(List continued on next page.)

Primary Examiner—Fred Teskin
Attorney, Agent, or Firm—Daniel N. Hall

[57] ABSTRACT

An anionic polymerization initiator includes the C-lithio reaction product of an organolithium compound and a tertiary-amino allyllithium or a tertiary-amino xylyllithium. When used in an anionic polymerization, a functional group from the initiator is incorporated onto the head of the growing polymer and a lithium atom is incorporated at the "living" end of the polymer chain prior to quenching. The initiator may be used to polymerize a monomer(s) including diolefin monomers, monovinyl aromatic monomers and trienes, and the living ends of the polymers are effectively maintained even at temperatures of up to 300° F. and higher. Such polymers exhibit an increased efficiency in coupling termination reactions, and products prepared from such polymers exhibit improved hysteresis characteristics. Products such as tires and the like can be prepared from such polymers and from vulcanizable elastomer compositions employing the polymers.

4 Claims, No Drawings

OTHER PUBLICATIONS

"A Bifunctional Anionic Initiator Soluble in Non-polar Solvents" by Beinert et al., *Makromol. Chem 179*, pp. 551–555 (1978).

"An improved synthesis of p–dimethylaminophenyl–lithium" by Hallas et al., *Chemistry and Industry*, pp. 620 (1969).

"Anionic Polymerization. VII Polymerization and Copolymerization with Lithium Nitrogen–Bonded Initiator" by Cheng, *American Chemical Society*, pp. 513–528 (1981).

"Anionic Polymerization Initiators Containing Protected Functional Groups and Functionally Terminated Diene Polymers" by Schulz et al., *Journal of Polymer Science: Polymer Chemistry Edition*, vol. 12, pp. 153–166 (1974).

"Anionic Polymerization Initiated by Diethylamide in Organic Solvents. I. The Use of Lithium Diethylamide as a Polymerization Catalyst and the Effect of Solvent Type on the Polymerization of Isoprene and Styrene" by Angood et al., *Journal of Polymer Science: Polymer Chemisty Edition*, vol. 11, pp. 2777–2791 (1973).

"Anionic Polymerization Initiators Containing Protected Functional Groups. II." by Schulz et al., *Journal of Polymer Science: Polymer Chemistry Edition*, vol. 15, pp. 2401–2410 (1977).

"Bifunctional anionic initiators: A Critical study and overview" by Bandermann et al., *Makromol. Chem 186*, pp. 2017–2024 (1985).

"Butadiene–Styrene Copolymerization Initiated by n–BuLi/THF/t–AmOK", by Lehong et at., *Journal of Applied Polymer Science*, vol. 44, pp. 1499–1505 (1992).

"6001 Chemical Abstracts", vol. 91, pp. 59 (1979).

"Copolymerization of Butadiene and Styrene by Initiation with Alkyllithium and Alkai Metal tert–Butoxides" by Wofford et al., *Journal of Polymer Science: Part A–1*, vol. 7, pp. 461–469 (1969).

"Lithium Amide Catalyzed Amine–Olefin Addition Reactions" by Schlott et al., *J. Org. Chem.*, vol. 37, No. 26, pp. 4243–4245 (1972).

"New perfectly difunctional organolithium initiators for block copolymer synthesis: Synthesis of dilithium initiators in the absence of polar additives", by Guyot et al., *Polymer*, vol. 22 (1981).

"Polymerization of Unsaturated Compounds in the Presence of Lithium Diethylamide" by Vinogradov et al., *Polymer Science U.S.S.R.*, vol. 4, pp. 1568–1572 (1963).

"Ortho Lithiation via a Carbonyl Synthon" by Harris et al., *J. Org. Chem.*, vol. 44, No. 12, pp. 2004 & 2006 (1979).

"Preparation and Reactions of Trialklytinlithium" by Tamborski et al., pp. 237–239, Jan. 1963.

"Preparation of Some Trialkyltin–lithium Compounds" by Gilman et al., *J. Am. Chem. Soc. 75*, pp. 2507–2509 (1953).

"Some Reactions of Tributyl– and Triphenyl–stannyl Derivatives of Alkali Metals" by Blake et al., *J. Chem. Soc.*, pp. 618–622, (1961).

"Specific Functionalization of Polymers by Carboxyl Groups" by Broze et al., *Makromol. Chem. 179*, pp. 1383–1386 (1978).

"Stereospecific Addition Reaction Between Butadiene and Amines"by Imai et al., *Tetrahedron Letters No. 38*, pp. 3317–3520 (1971).

"Studies of the Anionic Polymerization of Phenyl Vinyl Sulfoxide and its Copolymer with Styrene" by Kanga et al. *Macromolecules 23*, pp. 4235–4240 (1990).

"Synthesis of New Monomers by Addition Reactions of Diethylamine to 1,4–Divinylbenzene Catalyzed by Lithium Diethylamide" by Tsurta et al., *Makromol. Chem. 177*, pp. 3255–3263 (1976).

"The Microstructure of Butadiene and Styrene Copolymers Sythesized with n–BuLi/THF/t–AmOK" by Lehong et al., *Journal of Applied Polymer Science*, vol. 44, pp. 1507–1511 (1992).

"Thermal Elimination of Poly(phenyl vinyl sulfoxide) and its Polystrene Block Copolymers"0 by Kanga et al., *Macromolecules 23*, pp. 4241–4246 (1990).

One page translation of Japanese Abstract, Japanese Patent Application 87–180892/26.

One page Derwent Abstract of Japanese Patent JP54065788.

"Metalations of Benzyldimethylamine and Related Amines with n–Butyllithium in Ether. Deuteration to Form Ring and Side–chain Derivatives" by Jones et al., *J. Org. Chem. 23*, 663 (Mar. 1963) pp. 663–665.

TERTIARY-AMINO ALLYL-OR XYLYL-LITHIUM INITIATORS AND METHOD OF PREPARING SAME

TECHNICAL FIELD

The subject invention relates to the anionic polymerization of diene polymer and copolymer elastomers. More particularly, the present invention relates to anionic polymerization employing an amine-containing initiator compound. The amine initiator is a tertiary-amino allyllithium or a tertiary-amino xylyllithium.

Diene polymers and copolymers prepared according to the present invention, have reduced hysteresis characteristics. Articles such as tires, power belts and the like prepared from these polymers exhibit increased rebound, decreased rolling resistance and less heat build-up during mechanical stress operations. Further, the present initiators allow polymerizations to be run at high temperatures which is useful, for example, in promoting subsequent termination reactions such as coupling, or additions of hysteresis-reducing terminal groups.

BACKGROUND OF THE INVENTION

In the art it is desirable to produce elastomeric compounds exhibiting reduced hysteresis. Such elastomers, when compounded to form articles such as tires, power belts and the like, will show an increase in rebound, a decreased rolling resistance and less heat build-up when mechanical stresses are applied.

Previous attempts at preparing reduced hysteresis compounds have included high temperature mixing of the filler-rubber mixtures in the presence of selectively-reactive promoters to promote compounding material reinforcement; surface oxidation of the compounding materials; chemical modifications to the terminal end of polymers using tetramethyldiaminobenzophenone (Michler's ketone), tin coupling agents and the like and, surface grafting thereon. All of these approaches have focused upon increased interaction between the elastomer and the compounding materials.

It has also been recognized that carbon black, employed as a reinforcing filler in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen-containing compound or an alkyl benzoate. Additionally, the application discloses that both ends of the polydiene chains can be capped with polar groups by utilizing functionalized initiators, such as lithium amides.

The present invention provides novel initiators for anionic polymerization, to form elastomers with functional groups derived from said initiators. The functional groups are incorporated into the polymer chain providing improved dispersability of carbon black throughout the elastomeric composition during compounding. As will be described hereinbelow, these initiators are compounds containing a moiety derived from a tertiary-amino allyllithium or a tertiary-amino xylyllithium.

Organolithium polymerization initiators are also known in the art. For example, U.S. Pat. No. 3,326,881 discloses phenyllithium initiator and U.S. Pat. No. 3,439,049 discloses an organolithium initiator prepared from a halophenol in a hydrocarbon medium. Phenyllithium initiators have proven to be unstable.

U.S. Pat. No. 4,015,061 is directed toward amino-functional initiators which polymerize diene monomers to form mono- or di-primary aryl amine-terminated diene polymers upon acid hydrolysis.

U.S. Pat. No. 4,914,147 discloses terminal modifying agents including dialkylamino-substituted aromatic vinyl compounds such as N,N'-dimethylamino benzophenone and p-dimethylamino styrene, in rubber compositions having reduced hysteresis characteristics. In U.S. Pat. No. 4,894,409, an amino group-containing monomer, such as 2-N,N-dimethylaminostyrene is polymerized to form an amino group-containing diene based polymer.

It is also known in the art to conduct polymerizations employing hydrocarbon lithium initiators at high temperatures. However, elevated temperatures make it more difficult to maintain the "living" ends or the polymer-lithium bonds needed for efficient polymerization and termination reactions. With known initiators it has been found that the lithium constituent will often combine with an available alpha-hydrogen atom, resulting in lithium hydride, especially at elevated temperatures, thereby destroying the initiator and causing additional harmful side reactions. Hence, high temperature polymerizations have proven to be difficult to maintain and difficult to terminate efficiently.

A need exists therefore, for a polymerization initiator which when employed in an anionic polymerization, will result in a polymer chain having a functional group derived from the initiator. A need also exists for such an initiator which will perform effectively at high temperatures resulting in narrow molecular weight distribution polymers and retention of "living" ends.

SUMMARY OF INVENTION

It is therefore an object of the present invention to provide anionic polymerization initiators which promote the incorporation of functional, active groups in the polymer chain.

It is another object of the present invention to provide a method of preparing an anionic polymerization initiator.

It is another object of the present invention to provide a functionalized polymer.

It is still another object of the present invention to provide a method for the preparation of a functionalized polymer and for the polymerization of the polymer at high temperatures.

At least one or more of the foregoing objects together with the advantages thereof over the existing art, which shall become apparent from the specification which follows, are accomplished by the invention as hereinafter described and claimed.

In general an anionic polymerization initiator of the present invention comprises the metalation product of an organo lithium compound and a tertiary-amino compound having a general formula selected from

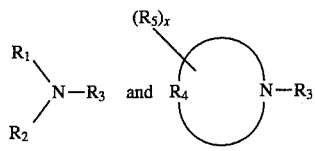

where $R_1$ and $R_2$ are the same or different and are selected from alkyls, cycloalkyls and aralkyls having from about 1 to about 12 carbon atoms; $R_3$ is a group selected from allyl, 2-methallyl and xylyl; $R_4$ is a carbocyclic group of from about 3 to about 20 methylene groups; each $R_5$ is an alkyl having from about 1 to about 20 carbon atoms; and x is an integer of from about 0 to about 10.

There is also provided a method of preparing an anionic polymerization initiator, which comprises reacting an organo lithium compound with a tertiary-amino compound having a general formula selected from

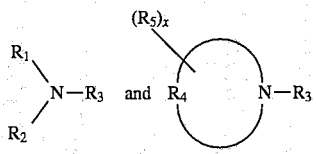

where $R_1$, $R_2$, $R_3$, $R_4$, $R_5$ and x are as described hereinabove.

A polymer according to the invention comprises a polymer chain having the general formula $R_6$-polymer-Li prior to quenching; wherein $R_6$ is a functional group derived from a polymerization initiator having a general formula selected from

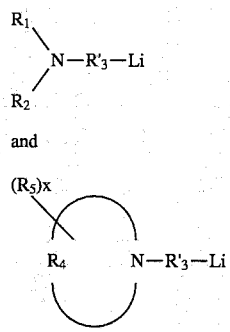

where $R_1$, $R_2$, $R_4$, $R_5$ and x are as described hereinabove and $R_3$ is formed by removing a hydrogen atom from the aforedescribed $R_3$ group.

A method according to the invention for preparing a polymer comprises initiating polymerization of at least one monomer selected from diolefin monomers having from about 4 to about 12 carbon atoms, monovinyl aromatic monomers having from about 8 to about 20 carbon atoms, and trienes, in the presence of a polymerization initiator having a general formula selected from

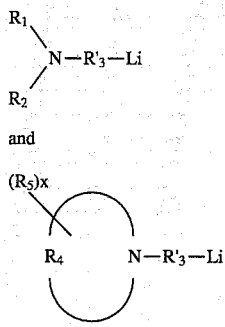

wherein $R_1$, $R_2$, $R_3$, $R_4$, $R_5$ and x are as described hereinabove.

PREFERRED MODE FOR CARRYING OUT THE INVENTION

As will become apparent from the description which follows, the present invention provides a novel lithio amine initiator for anionic polymerization of diene homopolymer and copolymer elastomers. Polymer molecules prepared with these initiators contain a functional group, and it has been discovered herein that vulcanizable elastomeric compounds and articles thereof made from such functionalized polymer molecules exhibit useful properties, particularly, reduced hysteresis. When compounded to make products such as tires, power belts and the like, these polymeric products of this invention exhibit increased rebound, decreased rolling resistance and less heat build-up during periods of applied mechanical stress.

It has been further unexpectedly found that polymerizations employing initiators according to the invention can be conducted at elevated temperatures as high as the peak temperatures resulting from the exothermic polymerization reactions, such as from about 120° F. to about 300° F. (about 49° C. to about 149° C.), or even higher temperatures. It is theorized that because the invention initiators either have no alpha-hydrogens proximate the lithium atom, or because the alpha-hydrogens are bonded to a carbon atom having a double bond, such as when the alpha hydrogen is bonded to a vinyl carbon, there is a reduced tendency for the lithium constituent of the initiator to be eliminated as lithium hydride. Furthermore, the lithium amide functionality, which is a likely promoter of side reactions, is absent in the present initiators. Hence, the living ends of the polymers are effectively maintained even at high temperatures. It is to be appreciated that polymerizations conducted at such elevated temperatures result in more efficient polymerizations and improved termination reactions, including improved monomer randomization and improved coupling ability of the polymers.

The initiators according to the present invention are amine-containing compounds. More particularly, the initiators according to the present invention are C-lithio allyl- or xylyl-amines having one or the other of the following general formulas:

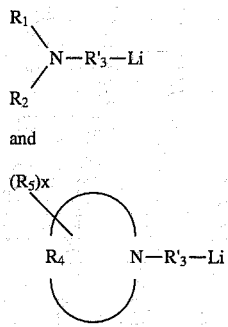

where $R_1$ and $R_2$ are the same or different and can be, for example, alkyls having from 1 to about 12 carbon atoms, cycloalkyls having from 3 to about 14 carbon atoms, and aralkyls having from 6 to about 20 carbon atoms. $R'_3$ is derived by removal of a hydrogen atom from an allyl, 2-methallyl, or a xylyl group, and $R_4$ contains from about 3 to about 20 methylene groups to form a cyclic amine group. The cyclic amines are preferred, and further, of the xylyl amines, ortho-xylyls are preferred. Such ortho-xylyl amines can be depicted as

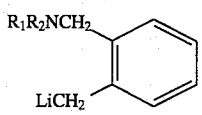

and

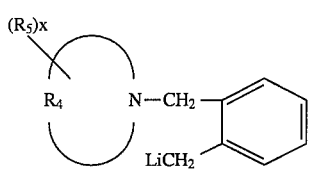

The methylene groups in $R_4$ can be substituted with preferably an alkyl $R_5$, having from about 1 to about 20 carbon atoms. Either none, a part or all of the methylenes in $R_4$ may be substituted, and hence, "x" is an integer of from 0 to about 20. When x is 0, all the methylenes are —$CH_2$-groups; when x is 1, one of the methylenes is a —$CHR_4$ or the like. Examples of initiators with substituted $R_4$ methylenes include

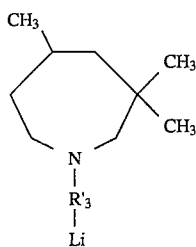

(where $R_4$ is a pentamethylene and x is 3)

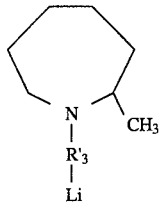

(where $R_4$ is pentamethylene and x is 1) and the like.

The initiators according to the present invention are preferably the metalation reaction product of an organolithium compound and an allyl- or xylyl-amine compound. One preferred class of organolithium compounds has the general formula RLi, where R is selected from the group consisting of alkyls and cycloalkyls having from about 1 to about 20 carbon atoms. Typical alkyls include n-butyl, s-butyl, methyl, ethyl, isopropyl and the like. The cycloalkyls include cyclohexyl, menthyl and the like. It has been found, that at least certain of the metalated initiators according to the invention, are more stable than lithium amide initiators as will be demonstrated hereinbelow.

As stated above, the organolithium compound is reacted with a an allyl, 2-methallyl or xylyl-amine compound, such as one of those having the following general structure:

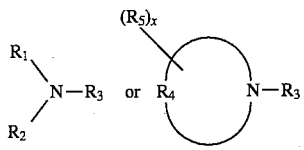

where $R_1$, $R_2$, $R_3$, $R_4$, $R_5$ and x are as defined hereinabove. The metalation reaction forming the initiators of this invention can, thus, be depicted as:

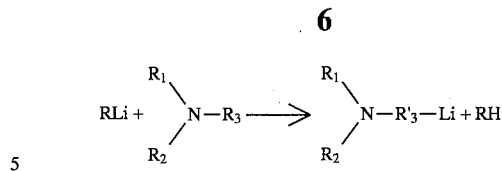

wherein $R_3$ is an allyl (—$CH_2CH$=$CH_2$), methallyl(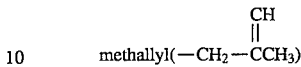)

or xylyl (—$CH_2PhCH_3$) group, or the like; R, $R_1$, $R_2$, $R_3$ and $R'_3$ are as described hereinabove; and Ph is a phenyl group.

Examples of useful initiators include hexamethyleneimino-o-xylyllithium (HMI-XyLi), pyrrolidino-o-xylyllithium (Py-XyLi), piperidino-o-xylyllithium (Pip-XyLi), hexamethyleneimino-methallyllithium (HMI-MAlLi), hexamethyleneimino-allyllithium (HMI-AlLi) and N,N-dioctylamino-allyllithium (DOA-MAlLi).

The initiator according to the present invention can be prepared by forming a solution of the allyl- or xylyl-amine compound in an anhydrous, aprotic solvent, such as cyclohexane or hexane. To this solution is then added the organolithium compound (RLi) in the same or a similar solvent. Both are allowed to react for approximately one to 24 hours at ambient temperature (25° C. to 30° C.). The metalation process is facilitated by additions of small amounts of an aprotic polar solvent such as an ether such as tetrahydrofuran (THF) in an amount of about 1 to about 40 mM THF per mM Li, with about 2–10 mM of THF being preferred. Amounts of the two reactants range from about 1.0 moles of the amine compound to about 1.0 to about 1.4 moles of organolithium compound, with a slight excess (5–10 molar percent) of organolithium being preferred. It is to be appreciated by one skilled in the art that various reaction temperatures and times may be useful and are within the scope of the present invention. Furthermore, other polar aprotic solvents such as tertiary amines and various other ethers may be added to give a soluble catalyst and enhanced metalation.

The initiator thus prepared, is employed to polymerize any anionically-polymerizable monomer to yield a polymer elastomer. Typically the initiator is used to polymerize unsaturated hydrocarbon monomers such as butadiene, isoprene and the like, and copolymers thereof with monovinyl aromatics such as styrene, alpha methyl styrene and the like, or trienes such as myrcene. Thus, the elastomers include diene homopolymers from monomer A and copolymers thereof with monovinyl aromatic monomers B. Exemplary diene homopolymers are those prepared from diolefin monomers having from 4 to about 12 carbon atoms. Exemplary vinyl aromatic copolymers are those prepared from monomers having from 8 to about 20 carbon atoms. Preferred elastomers include diene homopolymers such as polybutadiene and polyisoprene and copolymers such as styrene butadiene rubber (SBR). Copolymers can comprise from about 99 to 20 percent by weight of diene units and from about 1 to about 80 percent by weight of monovinyl aromatic or triene units, totalling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content.

The copolymers are preferably random copolymers which result from simultaneous copolymerization of the monomers A and B as is known in the art. The block copolymers, poly(b-B-b-A-b-B), result from the separate polymerization of the monomers forming the A and B polymers as is known in the art. Often, such block copolymers which include poly(b-styrene-b-butadiene-b-styrene) are thermoplastic elastomers, sometimes referred to as S-B-S polymers.

The initiators of the present invention form "living polymers" from the foregoing monomers, the general formula of which prior to quenching is

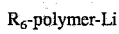

where the polymer is any of the foregoing diene homopolymers, monovinyl aromatic homopolymers, diene/monovinyl aromatic random copolymers and block copolymers and $R_6$ is a functional group derived from the initiator. Thus, the polymers of this invention, $R_6$-polymer Li, can also be represented by the following formulas:

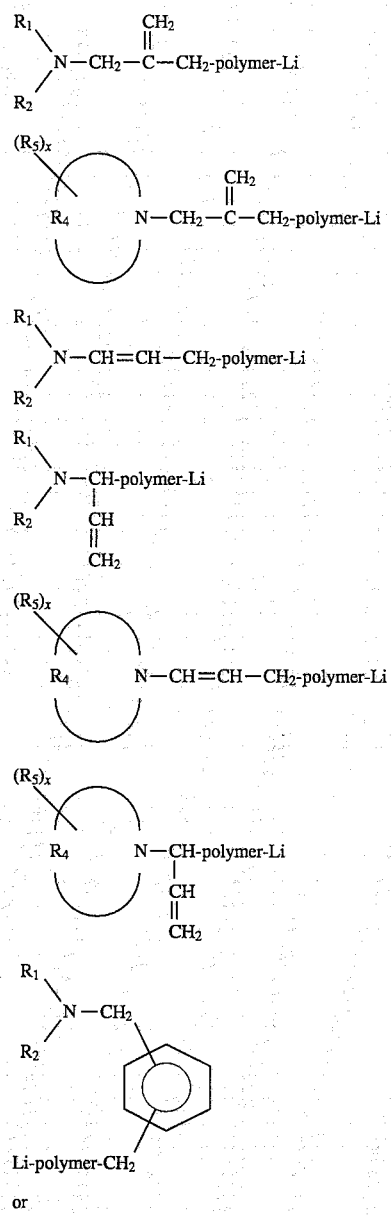

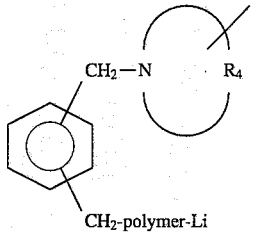

where polymer, $R_1$, $R_2$, $R_4$, $R_5$ and x are as defined hereinabove and Li is a lithium atom bonded to a carbon atom. The lithium proceeds to move down the growing chain polymer, as polymerization continues, until the reaction is quenched.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to increase vinyl content, a polar coordinator may optionally be added to the polymerization ingredients. Amounts range between 0 to 90 or more equivalents per equivalent of lithium. The amount depends upon the type of polar coordinator that is employed, the amount of vinyl desired, the level of styrene employed and the temperature of the polymerizations, as well as the selected initiator.

Compounds useful as polar coordinators are organic and include tetrahydrofuran, linear and cyclic oligomeric oxolanyl alkanes such as 2-2'-di(tetrahydrofuryl)propane, 2,2-bis(tetrahydrofuryl)propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane polar coordinators are described in U.S. Pat. No. 4,429,091 the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA).

Polymerization is begun by charging a blend of the monomer(s) and solvent to a suitable reaction vessel, followed by the addition of the polar coordinator and the initiator solution previously described. The procedure is carried out under anhydrous, anaerobic conditions. Often, it is conducted under a dry, inert gas atmosphere. The polymerization can be carried out at any convenient temperature such as 32° F. (0° C.) to 300° F. (149° C.). For semi-batch polymerizations, temperatures of at least about 180° F. (82° C.) are preferred. For batch polymerizations, it is preferred to maintain the peak temperature at from about 120° F. to about 300° F. (about 49° C. to about 149° C.), and more preferably from about 180° F. to about 250° F. (about 82° C. to about 121° C.). Polymerization is allowed to continue under agitation for about 0.15 to 24 hours. After polymerization is complete, the product is terminated in one or more ways.

For example, a protic quenching agent may be employed to give a monofunctional polymer chain. Quenching may be conducted in water, steam or an alcohol such as isopropanol, or any other suitable method. Quenching may also be conducted with a functional terminating agent, resulting in a difunctional polymer. Compounds providing terminal functionality (e.g., "endcapping") can be used such as tin tetrachloride, $(R_7)_3SnCl$, $(R_7)_2SnCl_2$, $R_7SnCl_3$, carbodiimides, N-cyclic amides, N,N' disubstituted cyclic ureas, cyclic amides, cyclic ureas, isocyanates, Schiff bases, 4,4'-bis(diethylamino) benzophenone, and the like. Tin tetrachloride is preferred. The organic moiety $R_7$ is selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl and the like. Preferred endcapping agents are selected from the group consisting of tin tetrachloride, tributyl tin chloride, dibutyl tin dichloride and 1,3-dimethyl-2-imidazolidinone.

While terminating to provide a functional group on the terminal end of the polymer is preferred, it is further preferred to terminate by a coupling reaction, with for example, tin tetrachloride or other coupling agent such as silicon tetrachloride ($SiCl_4$), esters and the like. As stated above, it has been found that the invention initiators provide for polymers having living ends maintained thereon. This allows effective and efficient tin coupling using tin tetrachloride, which results in a polymer having improved processability and resistance to hot and cold flow. It is preferred that the polymers according to the present invention have at least about 40 percent tin coupling. That is, about 40 percent of the polymer mass after coupling is of higher molecular weight than the polymer before coupling as measured, for example, by gel permeation chromotography. DOA-MAlLi (N,N-dioctylaminomethallyllithium), while effective for initiating polymerizations resulting in an elastomers exhibiting reduced hysteresis, also results in terminated polymers having only about 30 percent tin coupling, and hence, is not as preferred as the others initiators, as will be shown hereinbelow.

The terminating agent is added to the reaction vessel, and the vessel is agitated for about 1 to about 1000 minutes. Further examples of terminating agents include the terminators described in U.S. Pat. No. 5,066,729, the subject matter of which regarding terminating agents is incorporated by reference herein. It is to be understood that practice of the present invention is not limited solely to these terminators inasmuch as other compounds that are reactive with the polymer bound carbon-lithium moiety can be selected to provide a desired functional group.

Quenching is usually conducted by stirring the polymer and quenching agent for about 0.05 to about 2 hours at temperatures of from about 30° C. to 120° C. to ensure complete reaction. Polymers terminated with a functional group as discussed hereinabove, are subsequently quenched with alcohol or other quenching agent as also described hereinabove.

Lastly, the solvent is removed from the polymer by conventional techniques such as drum drying, extruder drying, vacuum drying or the like, which may be combined with coagulation with water, alcohol or steam. If coagulation with water or steam is used, oven drying may be desirable.

The polymers of the present invention contain a functional group at the head of the polymer chain (derived from the initiator) in addition to an optional functionality at the terminal end of the chain (derived from the terminating agent). These functional groups have an affinity for compounding materials such as silica or carbon black. Such compounding results in products exhibiting reduced hysteresis, which means a product having increased rebound, decreased rolling resistance and lessened heat build-up when subjected to mechanical stress. Products including tires, power belts and the like are contemplated. Decreased rolling resistance is, of course, a useful property for pneumatic tires, both radial as well as bias ply types and thus, the vulcanizable elastomeric compositions of the present invention can be utilized to form treadstocks for such tires. The composition can also be used to form other elastomeric tire components such as subtreads, black sidewalls, body ply skims, bead fillers and the like.

Polymers prepared according to the present invention and terminated or coupled with tin tetrachloride, show reduced hysteresis and increased coupling as compared to polymers initiated with conventional initiators such as n-butyllithium, as will be more fully explored hereinbelow.

The polymers of the present invention can be utilized as 100 parts of the rubber in the treadstock compound or, they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. It is to be appreciated that the minimum amount will depend primarily upon the degree of hysteresis reduction desired. Thus, the compounds can contain 10–100% by weight of the inventive polymer, with the balance, if any, being a conventional rubber.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black-containing compositions of the invention. Typical values for surface areas of usable carbon blacks are summarized in the TABLE I hereinbelow.

TABLE I

| CARBON BLACKS | |
|---|---|
| ASTM Designation (D-1765-82a) | Surface Area ($m^2$g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.1 to 10 phr. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black and other conventional rubber additives including for example, fillers, such as silica, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, a number of initiators were prepared. The initiators were then used to polymerize a solution of butadiene/styrene monomers. For comparison, polymerizations employing butyllithium and lithium amide initiators were also carried out.

TABLE II provides a listing of abbreviations, compound names and structures as used in the following examples and tables.

TABLE II

Abbreviations/Compounds/Structures

| ABBREVIATION | COMPOUND | STRUCTURE |
|---|---|---|
| BuLi | n-butyllithium | $CH_3CH_2CH_2CH_2CH_2Li$ |
| HMI-Li | lithium hexamethyleneimide | (7-membered ring)N—Li |
| PyLi | lithium pyrrolidinide | (5-membered ring)N—Li |
| HMI-XyLi | hexamethyleneimino-o-xylyllithium | o-C$_6$H$_4$(CH$_2$—N(hexamethyleneimino))(CH$_2$Li) |
| Py-XyLi | pyrrolidino-o-xylyllithium | o-C$_6$H$_4$(CH$_2$—N(pyrrolidino))(CH$_2$Li) |
| Pip-XyLi | piperidino-o-xylyllithium | o-C$_6$H$_4$(CH$_2$—N(piperidino))(CH$_2$Li) |
| HMI-MAlLi | hexamethyleneimino-methallyllithium | (hexamethyleneimino)N—CH$_2$—C(=CH$_2$)—CH$_2$Li |
| HMI-AlLi | hexamethyleneimino-allyllithium | (hexamethyleneimino)N—CH=CH—CH$_2$Li |

TABLE II-continued

| Abbreviations/Compounds/Structures | | |
|---|---|---|
| ABBREVIATION | COMPOUND | STRUCTURE |
| DOA-MAlLi | N,N-dioctylamino-methallyllithium | $(C_8H_{17})_2N-CH_2-C(=CH_2)-CH_2Li$ |

1. HMI-XyLi Initiator

In order to prepare HMI-XyLi, 60.8 grams of N-ortho-xylylhexamethyleneimine, 60 milliliters (ml) of dry tetrahydrofuran (THF) and 240 ml of dry hexane were added to a 28 ounce beverage bottle with a magnetic stirrer. The bottle was capped with a rubber liner and a crown two-hole cap. The bottle was then purged with nitrogen and placed on a magnetic stirrer plate. One hundred and ninety-six ml of a 1.68 molar solution of n-butyllithium (n-BuLi) in hexane, was added dropwise via a syringe to the stirred solution of N-ortho-xylylhexamethyleneimine at room temperature, and stirring continued overnight.

In order to determine the amount of conversion, a small sample of the reaction mixture was reacted with $ClSiMe_3$ (where Me is methyl) in THF. The reaction product was analyzed by gas chromatography, which showed an absence of $BuSiMe_3$. This indicated that all of the n-BuLi has reacted. Gilman titrations of additional samples of the reaction mixture showed that 89.6 percent of the lithium present was in the form of C—Li bonds.

2. Polymer Preparation Using HMI-XyLi

A 28 ounce beverage bottle was washed and then dried in an oven at 145° C., capped with a rubber liner/2 hole crown cap, and purged with nitrogen until room temperature was reached. To the bottle was added 236.8 grams of a blend of 75 percent by weight of 1,3-butadiene and 25 percent by weight of styrene in hexane. The two monomers comprised 20 percent by weight of the blend with hexane. To promote randomization, 0.26 millimoles (mM) of 2,2-bis (tetrahydrofuryl) propane in hexane (0.5 molar) was added. To this was then added 0.474 mM of HMI-XyLi prepared as hereinabove.

The beverage bottle was tumbled in an 80° C. water bath for 45 minutes, following which 0.38 ml of a 0.25 molar solution of tin tetrachloride in hexane was added. The bottle was then tumbled in a 50° C. water bath for 1 hour, after which the bottle was cooled to room temperature. There was then added to the viscous cement in the bottle, 1 cubic centimeter (cc) of isopropanol and 4 cc of a di-t-butyl-p-cresol (DBPC) solution (11.0 grams of DBPC in 700 cc hexane). The DBPC solution served as an antioxidant to prevent degradation of the polymer. The polymer was isolated by coagulation in 1100 cc of isopropanol followed by vacuum oven drying at 50°–55° C.

The polymer showed a glass transition temperature (Tg) at −34° C. and an Mn of 164,390, and a percent coupling of 61 percent (by gel permeation chromatography, G.P.C., analysis).

3. Large Scale Polymer Preparation

A. Batch Polymerization

Larger quantities of polymer were prepared under $N_2$ pressure in a 2 gallon, closed, stainless steel reactor vessel. The reactor allowed for temperature control and monitoring.

An "initial charge" preparation of a styrene/butadiene rubber (SBR) was made with the reactor temperature set at 122° F. (50° C.). A 75 weight percent butadiene and 25 weight percent styrene blend in hexane (19 percent by weight of monomers) was added to the reactor, followed by HMI-XyLi at 0.9 millimoles per 100 grams of monomer. The batch temperature peaked at 197° F. Five minutes after this temperature was reached, tin tetrachloride was added and the mixture was stirred for 30 minutes while the temperature was allowed to fall. The polymer was placed into isopropanol containing an antioxidant.

B. Semi-Batch Polymerization

In a semi-batch polymerization, the butadiene/styrene monomers were metered into the reactor at 200° F. (93.3° C.). This allowed for random distribution of the styrene monomer. It was found that with N—Li initiators such as hexamethyleneimine-lithium (HMI-Li), poor conversions to polymer and very little tin tetrachloride coupling would result. In contrast, with the HMI-XyLi initiator of this invention, high conversions to polymer (greater than 95 percent) and acceptable coupling (51–55 percent) were realized.

4. Polymer Evaluations

TABLE III below shows percent couplings of SBR polymers made with the recited initiators and terminated with tin tetrachloride. The table also shows the hysteresis loss, tan delta, of the polymers compounded in the standard test formula as provided in TABLE IV. All of the polymers in TABLE III were prepared at 80° C. in a manner similar to the methods described hereinabove. The desired target properties of the polymers prepared included an improvement, i.e., a reduction in the tan delta values over the control n-BuLi initiated polymers while still maintaining high levels, preferably greater than 40 percent, of coupling. In TABLE III, zero percent coupling indicates a polymer which was not reacted with tin tetrachloride, but rather was terminated with isopropanol. Also, where ranges are given the results are from more than one sample.

TABLE III

Tan Delta and % $SnCl_4$ Coupling For SBR's (20–25% styrene) Prepared at 80° C.

| Initiator | Percent Coupling | Tan. Delta (50° C.) |
|---|---|---|
| BuLi[a] | 56–64 | 0.116–0.124 |
| BuLi[a] | 0 | 0.183 |
| PyLi[a] | 17–20 | 0.094–0.102 |
| HMI-Li[a] | 22–34 | 0.102 |
| HMI-Li[a] | 0 | 0.103 |
| HMI-XyLi | 47–63 | 0.096–0.108 |
| HMI-XyLi | 0 | 0.117–0.138 |
| Py-XyLi | 55 | 0.103 |
| Py-XyLi | 0 | 0.147 |
| Pip-XyLi | 47 | 0.109 |
| Pip-XyLi | 0 | 0.150 |
| HMI-MAlLi | 48–57 | 0.105–0.106 |
| HMI-MAlLi | 0 | 0.147 |
| HMI-AlLi | 35–52 | 0.109–0.123 |

TABLE III-continued

Tan Delta and % SnCl$_4$ Coupling For SBR's
(20–25% styrene) Prepared at 80° C.

| Initiator | Percent Coupling | Tan. Delta (50° C.) |
|---|---|---|
| HMI-AlLi | 0 | 0.104–0.118 |
| DOA-MAILi | 30 | 0.138 |
| DOA-MAILi | 0 | 0.157 |

[a]Comparative, i.e., non-invention examples

TABLE IV

Compounding Test Formulation

| COMPONENT | PARTS BY WEIGHT |
|---|---|
| Polymer | 100 |
| Black (N-351) | 55 |
| Naphthenic Oil | 10 |
| Zinc Oxide | 3 |
| Antioxidant | 1 |
| Wax | 2 |
| Stearic Acid | 2 |
| Sulfur | 1.5 |
| Accelerator | 1 |

High levels of coupling are desirable in order to maintain good processability in the subsequent manufacturing of rubber products. Further, it is known that when polymers are compounded as for example, in the formulation shown in TABLE IV, compound viscosities are increased significantly. To attain manageable compound viscosities, lower molecular weight polymers must be used. However, these lower molecular weights result in both cold and hot flow problems during manufacturing processes and polymer storage. A known remedy for these problems is to tin couple the living anionic polymers using for example, tin tetrachloride. It has been found according to the present invention, that high couplings of 40 percent or higher are achieved.

From the data reported in TABLE III, it is shown that the N—Li or lithium amide type initiators (HMI-Li and PyLi) give polymers having reduced tan delta as compared to n-BuLi initiated polymers. However, these same polymers give unacceptably low levels of tin tetrachloride coupling. The initiators according to the present invention, including HMI-XyLi, PyXyLi, Pip-XyLi, HMI-MAILi and HMI-AlLi, gave both low tan deltas and high levels of tin tetrachloride coupling.

TABLE V shows stress/strain data for vulcanizates made from the test formulation of TABLE IV. Samples were cured for 20 minutes at 165° C. All of the SBR polymers were random copolymers, i.e., styrene distribution was random or non-block, with 20–25 percent by weight of styrene. Regardless of styrene content, the polymers were all targeted for glass transition temperatures of −40° C., within 5 degrees. Thus the lower styrene polymers generally contained higher levels of 1,2 microstructure in the butadiene portion of the polymers. Examples of microstructure variations versus Tg are given in TABLE VI. The microstructures were determined by NMR analysis which also confirmed the random styrene distribution.

TABLE V

Stress/Strain for SBR's Made at 80° C. with
Various Initiators/SnCl$_4$ - Coupling

| Initiator | 300% M, psi | Tensile Strength, psi | Elong. @ Break Percentage |
|---|---|---|---|
| Py-Li[a] | 2189 | 2210 | 353 |
| Py-Li[a] | 2315 | 2728 | 388 |
| HMI-Li[a] | 2792 | 3144 | 377 |
| HMI-Li[a] | 2452 | 3023 | 405 |
| HMI-XyLi | 2520 | 3279 | 416 |
| HMI-XyLi | 2365 | 3107 | 369 |
| Py-XyLi | 2471 | 2471 | 345 |
| Pip-XyLi | 2338 | 2796 | 401 |
| HMI-MAILi | 2691 | 3073 | 371 |
| HMI-AlLi | 2357 | 2846 | 400 |
| DOA-MAILi | 2111 | 2679 | 415 |

[a]Comparative, i.e., non-invention examples

TABLE VI

Microstructure - Tg Relationship

| Initiator | Tg, °C. | Percentage Styrene | Percentage 1,2 Bd (Bd = 100) |
|---|---|---|---|
| HMI-Li[a] | −45 | 26.3 | 43.0 |
| HMI-Li[a] | −38 | 20.4 | 53.1 |
| HMI-Li[a] | −39.5 | 26.4 | 47.4 |
| HMI-XyLi | −32 | 26.4 | 54.4 |

[a]Comparative, i.e., non-invention examples

Ranges of molecular weights and molecular weight distributions (Mw/Mn) together with respective Tg data, are shown in TABLE VII. Molecular weights of 110,000 for the non-coupled polymers were expected from the amounts of monomers and initiators charged.

TABLE VII

Molecular Weight Data for Polymers Made at 80° C.

| Initiator | Mn | Mw/Mn | Percentage Coupling (SnCl$_4$)[b] | Tg, °C. |
|---|---|---|---|---|
| PyLi[a] | 138,046 | 1.80 | 20 | −37 |
| HMI-Li[a] | 133,862 | 1.60 | 26 | −41 |
| HMI-Li[a] | 105,364 | 1.26 | 0 | −37 |
| HMI-XyLi | 206,545 | 2.02 | 54 | −38 |
| HMI-XyLi | 119,120 | 1.16 | 0 | −40 |
| HMI-XyLi | 164,386 | 1.86 | 61 | −34 |
| HMI-MAILi | 196,217 | 2.38 | 48 | −33 |
| Py-XyLi | 175,465 | 1.78 | 55 | −33 |
| Py-XyLi | 106,711 | 1.20 | 0 | −36 |
| Pip-XyLi | 228,512 | 1.91 | 47 | −35 |
| Pip-XyLi | 147,814 | 1.20 | 0 | −42 |
| HMI-AlLi | 127,464 | 1.89 | 35 | −38 |
| HMI-AlLi | 110,280 | 1.22 | 0 | −37 |

[a]Comparative, i.e., non-invention examples
[b]"0" coupling indicates terminations with isopropanol instead of SnCl$_4$ In batch polymerizations, the polymerizations were allowed to exotherm, resulting in a peak temperature of about 180° F. to about 300° F. (about 82° C. to about 149° C.). As the concentration of monomers was increased, the peak temperatures also increased. Normally, if undesirable results at high temperatures are encountered, the monomer concentration must be decreased, resulting in reduced productivity. The effects of peak temperature increases on tin tetrachloride coupling with N—Li initiators are shown in TABLE VIII.

TABLE VIII

Temperature Effects on % Coupling Via SnCl$_4$
In Initial Charge Reactor Polymerizations

| Initiator | Peak Temp., °F. | Percentage Coupling | Polymer |
|---|---|---|---|
| HMI-Li[a] | 140 | 74 | SBR |
| HMI-Li[a] | 194 | 58 | SBR |
| HMI-Li[a] | 202 | 59 | SBR |
| HMI-XyLi | 197 | 93 | SBR |
| HMI-Li[a] | 228 | 26 | BR (low 1,2 content) |
| HMI-XyLi | 228 | 67 | BR (low 1,2 content) |

[a]Comparative, i.e., non-invention examples

The percent coupling is significantly reduced as peak temperature is increased in polymerizations with HMI-Li initiators. In the polybutadiene (BR) example, a fairly high peak temperature was observed because of the higher starting temperature necessary in polymerizations with no or very little vinyl modifier (e.g., ethers or trialkyl amines). With the HMI-XyLi invention initiator, improved level of coupling at high temperatures is observed.

In the semi-batch SBR polymerizations, the monomers are charged at high temperatures, preferably about 200° F. to about 250° F. (about 93° C. to about 121 ° C.), which forces random distribution of styrene in the copolymer. With N—Li type initiators such as HMI-Li, there is low conversion to polymer and poor tin tetrachloride coupling. TABLE IX shows results obtained from semi-batch preparation of SBR using HMI-XyLi at 202° F. to 205° F. (94.4° C. to 96.1° C.), with tin tetrachloride coupling.

TABLE IX

Semi-Batch Preparation of SBR Using HMI-XyLi

| Batch T, °F. | Percent Conversion | Percent Coupling | Percent Styrene | Tg, °C. | 50° C. Tan Delta |
|---|---|---|---|---|---|
| 205 | 98.5 | 55 | 34.2 | −42 | 0.103 |
| 202 | 97.5 | 51 | 38.5 | −35 | 0.111 |

The data shows high conversion to SBR with desirable tan deltas and sufficiently high percent coupling to prevent subsequent flow problems. The polymers had a molecular weight before coupling of from 115,800 to 121,700.

As stated above, other terminators can also be employed in the practice of the present invention. For example, 1,3-dimethyl-2-imidazolidinone and 1-methyl- 2-pyrrolidinone were employed and resulted in SBR polymers with Mn of 74,127 and 91,129 respectively, and when compounded, tan deltas of 0.102 and 0.107 respectively.

In conclusion, it is clear from the foregoing examples and specification disclosure that the initiators of the present invention are useful for the anionic polymerization of diene monomers at elevated temperatures, to form homopolymers as well as copolymers with monovinyl aromatic polymers or trienes. The resulting elastomeric polymers have a functional group at the site of initiation and a lithium atom at the terminal, "living" end. After quenching, the polymers still retain the functional group at the site of initiation, which promotes uniform and homogeneous mixing with carbon black. As a result vulcanizable elastomeric compounds containing these polymers exhibit improved hysteresis which provides lower rolling resistance in tires and improved fuel economy. Additionally, the lithium terminated polymers can be quenched with compounds to provide terminal functional groups and hence, difunctional polymer chains. The polymers also exhibit improved tin tetrachloride coupling.

It is to be understood that the invention is not limited to the specific reactants, initiators, and organolithium compounds disclosed nor to any particular modifier or solvent. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. An anionic polymerization initiator comprising:

the reaction product of an organo lithium compound and a tertiary-amino compound wherein said reaction product is selected from hexamethyleneimino-o-xylyllithium, pyrrolidino-o-xylyllithium, piperidino-o-xylyllithium, hexamethyleneimino-methallyllithium, hexamethyleneimino-allyllithium, and N,N-dioctylamino-allyllithium.

2. An initiator, as set forth in claim 1, wherein said organolithium compound has the formula RLi, where R is selected from the group consisting of alkyls and cycloalkyls having from about 1 to about 20 carbon atoms.

3. A method of preparing an anionic polymerization initiator, comprising:

reacting an organo lithium compound with a tertiary-amino compound having a formula selected from

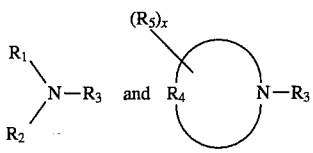

where $R_1$ and $R_2$ are the same or different and are selected from alkyls having from 1 to about 12 carbon atoms, cycloalkyls having from 3 to about 14 carbon atoms, and aralkyls having from 6 to about 20 carbon atoms; $R_3$ is a group selected from allyl, 2-methallyl and xylyl; $R_4$ is a carbocyclic group of from about 3 to about 20 methylene groups; each $R_5$ is an alkyl substituent on a methylene group having from about 1 to about 20 carbon atoms; and, x is an integer of from 0 to about 10;

wherein each said organolithium compound and said tertiary amine are dissolved in an anhydrous aprotic solvent containing from about 1 to about 40 mM of tetrahydrofuran per mM of Li.

4. A method, as set forth in claim 3, wherein said step of reacting includes reacting about 1.0 mole of said tertiary amine compound with about 1.0 to about 1.4 moles of said organolithium compound.

* * * * *